Feb. 13, 1945.　　　　　H. W. IBBOTT　　　　　2,369,463
RESPONSIVE DEVICE FOR PRODUCING AND TRANSMITTING
VARIABLE FLUID PRESSURE
Filed March 20, 1944
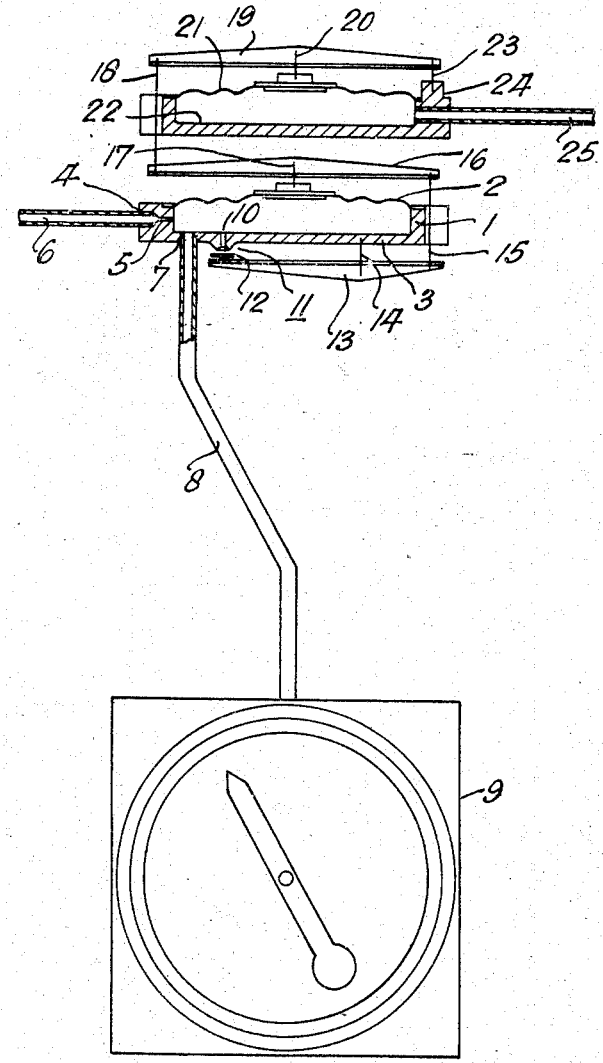

Patented Feb. 13, 1945

2,369,463

UNITED STATES PATENT OFFICE 2,369,463

RESPONSIVE DEVICE FOR PRODUCING AND TRANSMITTING VARIABLE FLUID PRESSURE

Harold William Ibbott, London, England, assignor to Henry Noel Negretti and Paul Ernest Negretti, both of London, England Application March 20, 1944, Serial No. 527,310
In Great Britain February 10, 1943

5 Claims. (Cl. 137—153)

This invention relates to a responsive device for producing and transmitting variable fluid pressure to a pressure gauge or other pressure-responsive instrumentality.

It is adapted to produce such variable fluid pressure in accordance with changes in various kinds of physical conditions (e. g., pressure and temperature) or mechanical movements.

The main object of the invention is to provide such a device as can be readily utilised to convert variables into changes of air or gas pressure which may be transmitted for measurement to a pressure gauge.

It is also an object of the invention that the device shall not be liable to errors due to external influences, such as vibrations or accelerations of movement of the vehicle or machine on which the instrument is employed.

The device according to the invention, for converting variables into changes of gas pressure which may be transmitted to pressure-responsive instrumentalities, comprises a vessel having a part movable according to pressure changes in the vessel, an inlet adapted to receive a restricted flow of gas from the pressure supply, an outlet for transmitting the gas pressure in the vessel to a pressure-responsive instrumentality, and an escape outlet, a valve controlling the amount of a small escape of gas through the escape outlet whereby the pressure in the vessel is changed, means whereby the valve is adjusted according to changes in the variable and means whereby the valve receives a counter-adjustment from the movable part of the vessel.

The means whereby the valve is adjusted may comprise a movable response member controlled by the variable and transmitting its movements to a valve member movable adjacent to the escape outlet.

Preferably a movable response member controlled by the variable is coupled to the valve through a system of levers and links. In this case the system may include a connection with the movable part of the vessel whereby the valve receives its counter-adjustment. For example, the connection may be a fulcrum of a lever in the system.

In the preferred form of the invention, the levers and links of the above mentioned system are arranged and mounted so that movements, due to external influences, of the levers and of movable parts connected to them are balanced out within the system and thus do not affect the position of the valve.

The system may accordingly comprise a lever carrying a movable member of the valve and pivotally linked to a fixed part, a second lever pivotally linked thereto and to the movable part of the vessel, and a third lever pivotally linked to the second lever, to the movable response member and to a fixed part. A suitable form of link is a flexible strip secured at its ends to the parts it connects.

It is preferred that the movable element of the valve shall open with and close against the escaping air or gas flow. It may, for example, be a palette situated outside an opening of the collapsible vessel.

Among various forms which the movable response member may take is a diaphragm exposed to fluid pressure derived in a known manner from the physical condition or mechanical movement concerned. It may be applied to respond to variables to be measured on aircraft, such as engine revolutions per minute, fuel content, fuel consumption, air temperature, oil temperature, oil pressure, flap and undercarriage position indicators and other variables.

The vessel interposed between the supply of air or gas pressure and the indicating pressure gauge may comprise a diaphragm at the opposite end of the vessel to a rigid wall, and the lever carrying the movable valve element may be pivotally linked to the rigid wall whilst an intermediate lever, transmitting movement from a lever connected to the movable response member is pivotally connected to the diaphragm and linked to the first mentioned lever. These levers will normally lie substantially parallel to one another and be balanced and arranged so that relative movements between fixed and movable parts due to external influences are balanced out so that the movable valve element is not affected.

In a preferred form of the construction of the device according to the invention a vessel, which may be of small depth, has a rigid circular base and side cylindrical wall and a top constituted by a flexible corrugated diaphragm. In the side wall is formed an inlet for connection through a restriction with a pressure supply of air or gas. In the base is an outlet for connection with a pressure gauge, and also a small escape outlet. A lever is pivotally linked or fulcrumed by means of a flexible strip to the base of the vessel and carries at one end a palette adjacent to the outside of the small escape outlet. At the other end the lever carries a flexible link connecting it to one end of a second lever pivotally linked or fulcrumed to the diaphragm. At its other end the second lever carries a flexible link pivotally connecting it to the end of a third lever. This third lever is pivotally linked or fulcrumed at its other end to the top or side wall of a second collapsible vessel, generally similar to the first collapsible vessel, but without the outlets in the base thereof. The third lever is pivotally linked to the top of the diaphragm of the second collapsible vessel at a point intermediate to its ends. An inlet in the side wall of the second collapsible vessel conveys fluid pressure corresponding to or derived from the physical condition to be measured.

In operation, when a change of pressure occurs in the second collapsible vessel the third lever is rocked and the movement is transmitted through the second or intermediate lever to the first lever causing a change of position of the palette relative to the small escape outlet. Due to the change in the amount of escape thereby caused, pressure builds up or subsides in the first collapsible vessel according to whether the small escape outlet is further closed or opened. This new pressure in the first collapsible vessel brings about a corresponding movement of its diaphragm thereby imparting movement into the lever system and this brings about a state of balance with the palette adjusting the valve opening according to the new pressure which will be maintained in the first collapsible vessel. This new pressure is transmitted to the pressure gauge which accordingly gives a reading dependent on the pressure then existing in the second collapsible vessel which in turn is in accordance with the changed physical condition.

The invention is illustrated by way of example in the accompanying drawing which is in sectional elevation. In this drawing, 1 indicates a vessel having at one end a flexible diaphragm 2 and at the opposite end a rigid wall 3. The vessel is provided with an inlet 4 having a restriction 5 for receiving flow of air from a pressure supply through the pipe 6. The vessel is also provided with an outlet 7 connected by a pipe 8 to a pressure gauge 9. The vessel is further provided with a small escape outlet 10.

The escape outlet 10 is controlled by a valve 11 comprising a palette 12 carried by a lever 13 which is fulcrumed by the flexible strip 14 to the rigid end 3 of the vessel. At its other end the lever 13 is connected by a flexible link 15 to one end of a second lever 16 which is fulcrumed by a flexible strip 17 to the flexible diaphragm 2. The other end of the second lever 16 is connected by the flexible link 18 to one end of a third lever 19 which is fulcrumed by a flexible strip 20 to a flexible diaphragm 21 sealing the top of a container 22. The other end of the third lever 19 is connected by a flexible strip 23 to the fixed part 24 of the container 22.

The container 22 is provided with an inlet 25 for the admission of fluid at variable pressure, which in the present case may be considered as the pressure of fuel supplied to an internal combustion engine, it being the purpose of the apparatus to convert changes in the pressure of the fuel supply into changes of air pressure transmitted to the pressure gauge 9.

In operation, when a change of pressure in the fuel supply occurs the diaphragm 21 responds by an upward or downward movement as the case may be. This movement rocks the lever 19 and its movement is transmitted through the link 18, lever 16, and link 15, to the lever 13 carrying the palette 12, causing a change of position of the latter relative to the small escape outlet 10. Due to the change in the amount of escape thereby caused, pressure builds up or subsides in the vessel 1 according as to whether the small escape outlet has further closed or opened. This new pressure in the vessel 1 brings about a corresponding movement of the diaphragm 2 thereby imparting an upwards or downwards movement of the lever 16 which is transmitted to the palette 12 in counteraction to the original movement of the palette whereby there is brought about a state of balance with the palette adjustment the valve opening according to the new pressure which will be maintained in the vessel 1. This new pressure is transmitted to the pressure gauge 9 which accordingly gives a reading depending on the pressure then existing in the container 22, which in turn is in accordance with the pressure of the fuel supply.

It will be appreciated that the arrangement and mounting of the levers and links in the system illustrated in the drawing is such that movements due to external influences are balanced out within the system and thus do not affect the position of the valve 11.

What I claim is:

1. Device for converting variables into changes of gas pressure which may be transmitted to pressure-responsive instrumentalities, comprising a vessel, having a part movable according to pressure changes in the vessel, an inlet adapted to receive a restricted flow of gas from a pressure supply, an outlet for transmitting the gas pressure in the vessel to a pressure-responsive instrumentality, and an escape outlet, a valve member movable adjacent to the escape outlet, a movable response member controlled by the variable, a first lever carrying the valve member, a second lever pivotally linked to the first lever and to the movable part of the vessel, and a third lever pivotally linked to the second lever and to the movable response member, the device having fixed parts to which the first and third levers are respectively fulcrumed.

2. A device for transmitting to a pressure-responsive instrumentality gas pressure changing in accordance with changes in a variable, comprising a vessel having an inlet adapted for connection with a pressure supply of gas, an outlet adapted for connection with the pressure-responsive instrumentality, an escape outlet, a rigid wall and a flexible wall, a lever pivoted to the rigid wall, a palette carried by the lever adjacent to the escape outlet, a second lever pivoted to the flexible wall and pivotally linked to the first lever, a movable response member controlled by the variable, and a third lever pivotally linked to the second lever and to the movable response member, the device having a fixed part to which the third lever is pivoted.

3. A device as claimed in claim 2 in which the movable response member is a diaphragm exposed to variable pressure.

4. A device as claimed in claim 2 including a vessel having an inlet for fluid whose pressure is derived from the variable, a rigid wall, and a flexible wall, the flexible wall constituting said movable response member and the third lever being pivoted to the rigid wall herein mentioned.

5. A device as claimed in claim 2 arranged so that the three levers lie substantially in parallel relationship.

HAROLD WILLIAM IBBOTT.